US005271173A

United States Patent [19]

Huang

[11] Patent Number: 5,271,173
[45] Date of Patent: Dec. 21, 1993

[54] STRUCTURE OF A MUSICAL PICTURE FRAME

[76] Inventor: Shu-Jen Huang, Fl. 5, No. 20, 25 Alley, Min Chuan E. Rd., Taipei, Taiwan

[21] Appl. No.: 914,340

[22] Filed: Jul. 17, 1992

[51] Int. Cl.[5] .......................... A47G 1/06; C09F 19/00

[52] U.S. Cl. .......................................... 40/152; 40/455; 84/94.2

[58] Field of Search ................. 40/152, 455, 457, 906; 84/94.2, 95.2, 600, 601, 602

[56] References Cited

U.S. PATENT DOCUMENTS 2,321,365 6/1943 Darche ................................ 84/94.2
5,020,409 6/1991 Hou ...................................... 84/95.2
5,070,755 12/1991 Carroll ................................ 84/95.2

*Primary Examiner*—Kenneth J. Dorner
*Assistant Examiner*—Cassandra Davis
*Attorney, Agent, or Firm*—Lowe, Price, LeBlanc & Becker

[57] ABSTRACT

A musical picture frame for generating music for a picture frame and creates an elegant and romantic atmosphere for the memory. The picture frame can be inserted into a musical structure which is composed of a pressure seat, a rubber conductor, a PC board and a base seat. With fingers pressing on the pressure seat, the rubber conductor will be forced to contact with the PC board circuit and proper music will then generated.

2 Claims, 3 Drawing Sheets

STRUCTURE OF A MUSICAL PICTURE FRAME

BACKGROUND OF THE INVENTION

This invention is for a structure of a musical frame. The side of the picture frame can be inserted into a structure to generate appropriate music.

Time and objects alter rapidly. The past experiences can only be preserved through picture collections. When people look at pictures, they usually will have music played in their minds to accompany the memories. The histories, good or bad, will be remembered again in the music.

To be worth preserving, picture frames are usually made of wood. However, they can no longer provide memorable feelings after being used for a long time. People are fond of the music they remembered to couple with the scenes in the past. A limitation is that a musical picture frame can only be used when one is alone. It is not appropriate to use in the office.

To improve quality of modern life and provide a memorable atmosphere when one is facing a picture and trying to go into the past, the this inventor has come up with this invention through extensive research, testing and improvement so as to beautify life.

SUMMARY OF THE INVENTION

This invention is for a structure of a musical frame. On the side of the picture frame is an inserting plate which can be inserted into a structure to provide proper music. The structure is composed of a pressure seat, a rubben conductor, a PC board and a base seat. When press on the pressure seat, the rubber conductor will be forced to contact with the circuit on the PC board to generate appropriate music. The power required by the PC comes from the battery on the base seat and enbles the music to come out from the sound orifice to create a practical, elegant, romantic and memorable environment.

BRIEF DESCRIPTION OF THE DRAWINGS

In order for the reviewers to fully understand, the following explanations describe the structure and technique of this invention in detail.

DETAILED DESCRIPTION OF THE PREFERRED EMBODIMENT

Figure 1:
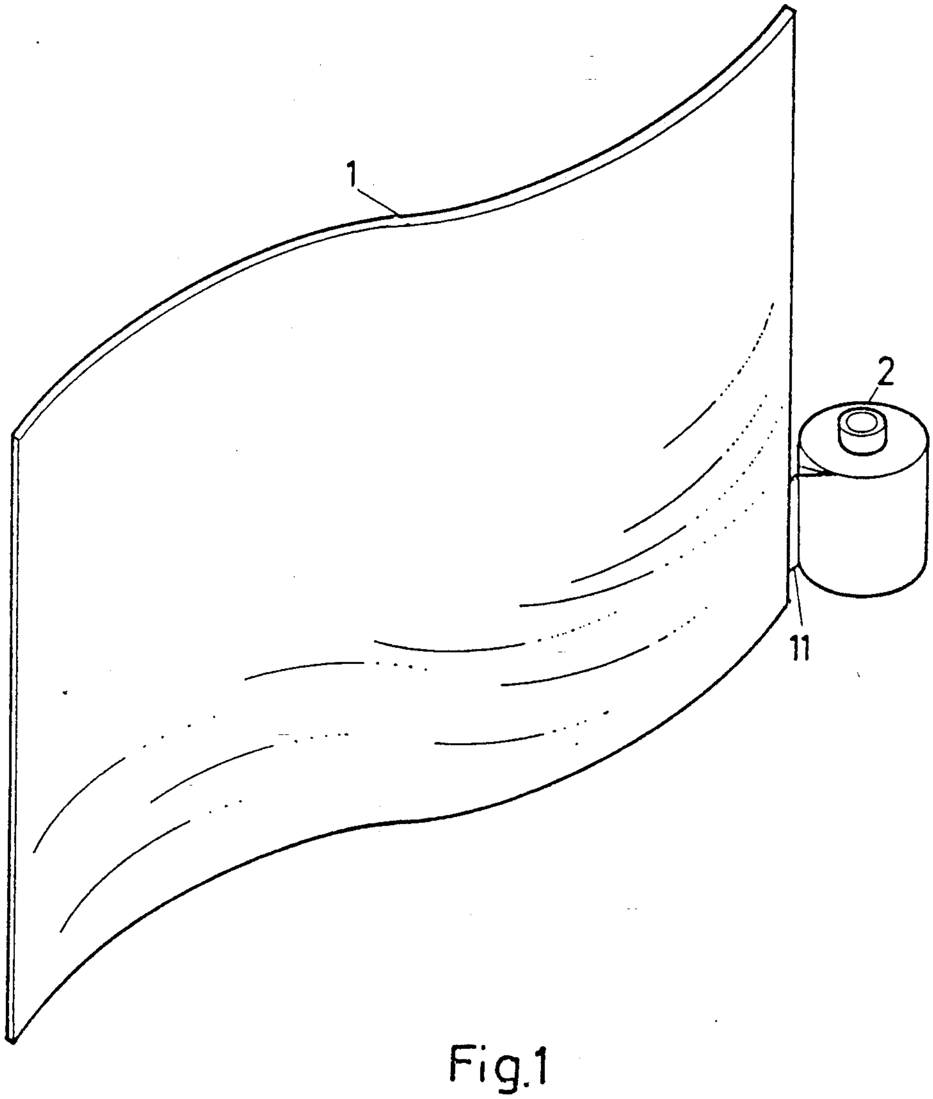
FIG. 1 External view of this invention

Refering to FIG. 1, this invention is composed of a picture frame (1) and a musical structure (2). The picture frame (1) has an inserting plate (11) which can be inserted into a portable and practical structure with a musical structure (2).

Figure 2:
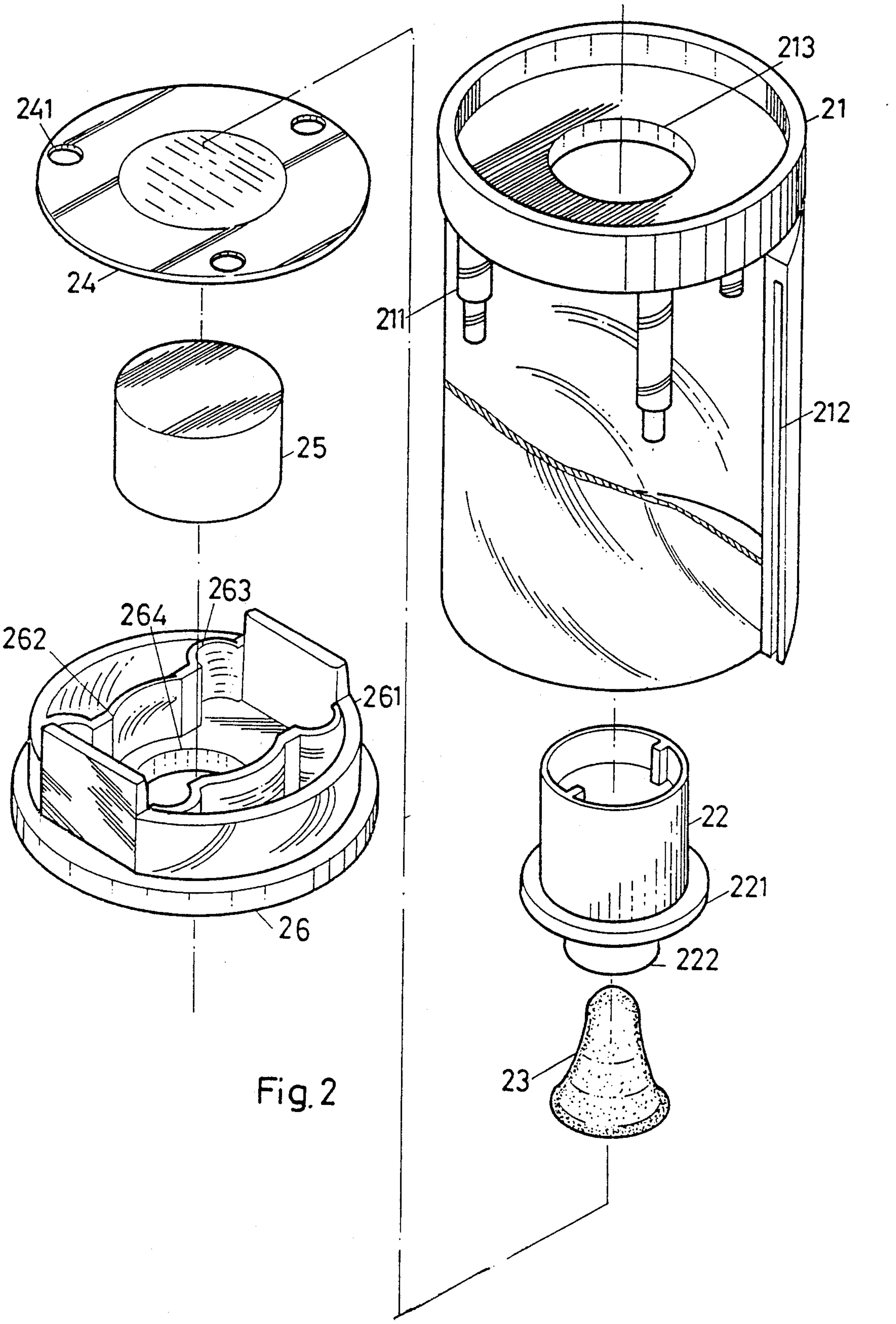
FIG. 2 Perspective view of the musical structure
Figure 3:
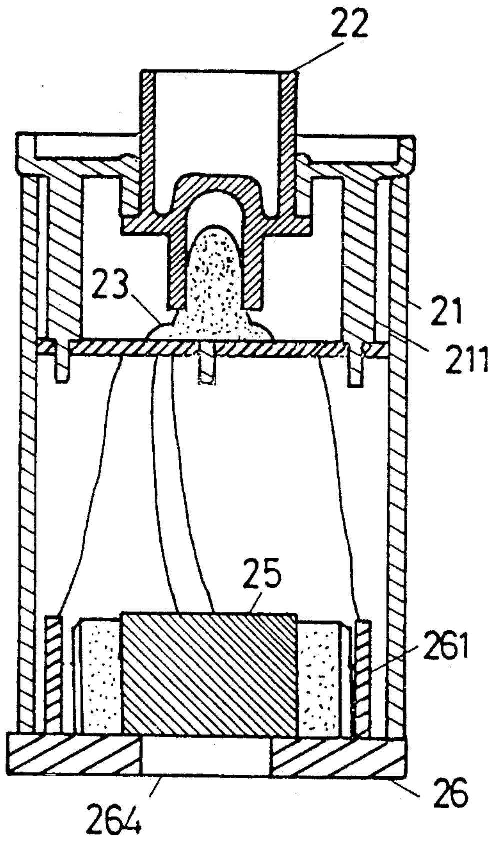
FIG. 3 Cross-section of musical structure

Please refer to FIG. 2 and FIG. 3 for a detailed description on the components of the musical structure (2). The musical structure (2) is composed of a cylinder (21), a pressure seat (22), a rubber conductor (23), a PC board (24), a speaker (25) and a base plate (26). The cylinder (21) has a hollow shell and is installing pins (211), spaced equal distances. Its outer rim has a arc-shaped slot (212) so that the inserting plate (11) on the frame (1) can be inserted. The opening (213) on the top enables the pressure seat (22) and rubber conductor (23) to be installed from the bottom. The pressure seat (22) extends partially to the outside of the opening (213).

At the bottom of the pressure seat (22) is a stop plate (221) which closely attaches to the cylinder (21). A hollow tube (222) at the bottom of the stop plate (221) receives the rubber conductor (23).

The assembly is completed with a base peat (26) mounted to the bottom of the cylinder (21). A circular rim (261) on the base seat (26) closely contacts with the cylinder (1). Inside the circular rim (261) are the speaker housing (262) and battery housing (263) which provides power to PC board (24) and enables music from the speaker (25) to emit through sound orifice (264) on the base seat (26).

After the assembly is completed, press on pressure seat (22) will force rubber conductor (23) in contacting with the circuit on the PC board (24). The voice IC will then generate proper music for the picture (such as romantic music for lover's picture and home sweet home music for family's picture . . . ). A memorable atmosphere is this created.

This invention prevents the picture frame from being dull and with the help of a precise design, a practical and innovative musical frame structure is created. This innovation complys with the creativity and practicality of new patent requirements. The application is submitted for review according to the patent law practices. Your granting of the patent will be highly appreciated.

I claim:

1. A musical frame comprising a picture frame having an inserting plate extending from an edge thereof;
   - a music generating structure having a cylindrical housing with a slot therein releasably receive the plate therein to mount the structure on the frame said structure further comprising:
   - a top plate mounted on said housing having an axial opening therethrough, a plurality of pins having lower ends mutually spaced along a bottom surface of and depending from said top plate downwardly into said housing; PC board music means mounted within the housing below the top plate and affixed to the lower ends of said pins for generating music; pressure seat slidably received in the opening in said top plate; a resilient rubber conductor means connecting said pressure seat and said PC board music means for activating said music means responsive to depressing said seat in the opening in said top plate; a base plate mounted on said housing at a bottom thereof; speaker and battery means mounted on said base plate and coupled to said music means for generating music when said pressure seat is depressed.

2. The frame of claim 1 wherein said conductor is substantially conical and disposed within the base and resting on the PC board music means.

* * * * *